W. C. FARNUM.

Climbing Toy.

No. 9,781. Reissued June 28, 1881.

Witnesses
J. J. Keane
Fred. Hayes

Inventor
William C. Farnum
By his attorney
Edwin H. Brown

N. PETERS, Photo-Lithographer, Washington, D. C.

UNITED STATES PATENT OFFICE.

WILLIAM C. FARNUM, OF HOOSICK FALLS, NEW YORK.

CLIMBING TOY.

SPECIFICATION forming part of Reissued Letters Patent No. 9,781, dated June 28, 1881.

Original No. 240,510, dated April 26, 1881. Application for reissue filed June 6, 1881.

*To all whom it may concern:*

Be it known that I, WILLIAM C. FARNUM, of the village of Hoosick Falls, in the county of Rensselaer and State of New York, have invented certain Improvements in Climbing Toys, of which the following description, in connection with the accompanying single sheet of drawings, constitutes a specification.

The said improvements consist in certain devices embraced in the mechanism of an automaton adapted to be actuated by a cord and designed to co-operate therewith, and by means of which the manipulator, by an alternate tightening and slackening of the cord, can cause the automaton to travel along the cord by a succession of movements closely imitating a human being or an animal in the act of climbing a rope.

For the purpose of illustrating my invention I have shown two applications of the operative principle, in the first as applied to a climbing automaton, and in the second as embodied in an apparatus for propelling a vehicle or receptacle between two points by means of a single cord having one end firmly fastened on one side of the interval to be traversed, the other end being free to be manipulated by the operator, as will be hereinafter more fully set forth.

The object sought to be accomplished by my invention is to propel a body along or upon a single cord or line by combining with a cord or line certain devices constructed upon or attached to the object or body to be propelled, so that by alternately tightening and slackening the cord or line to the extent of operating the said devices the body will be propelled.

Figure 4:
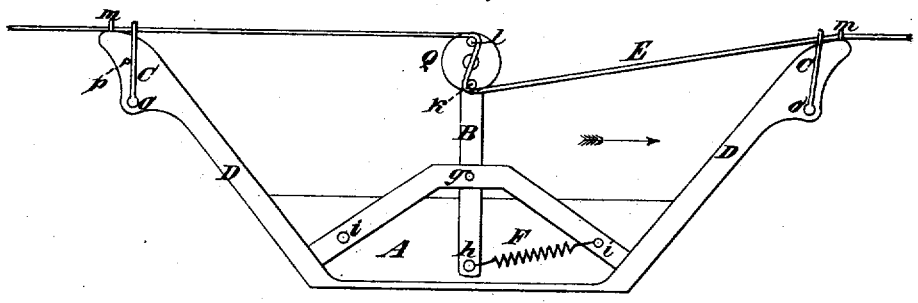
Figure 1:
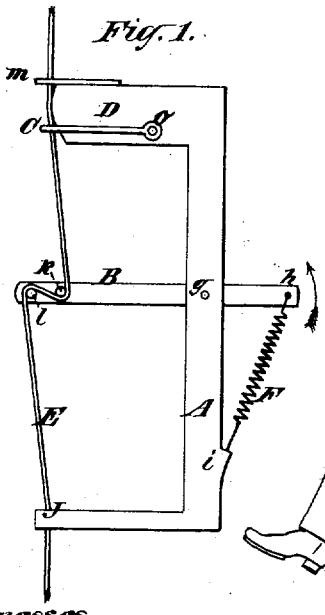
Figure 2:
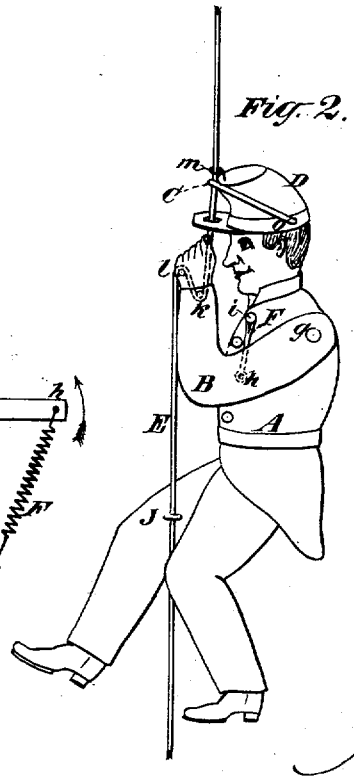
Figure 3:
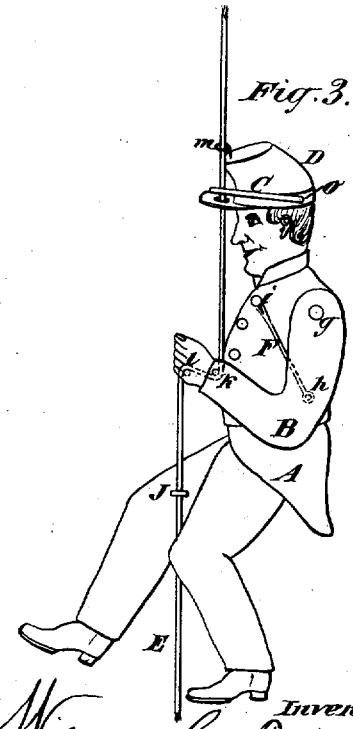

Figure 1 of the drawings is a naked outline sketch of only such parts as are essential to work the invention. Fig. 2 is a view of an automaton strung on a cord and shown in position at rest. The upper end of the cord is supposed to be fastened, and the figure is held suspended on the cord by means of the gripe maintained on it by bight C. Fig. 3 is a view of the same figure, showing the position it assumes when the cord E has been strained taut by pulling on it at the lower end. Fig. 4 is an embodiment of the said devices in an apparatus for traversing otherwise impassable ways, such as spans between buildings at high altitudes, gulfs, or rivers, &c.

In Fig. 1 A represents a rigid bar wrought to any appropriate shape, so as to furnish opportunities for the attachment of lever B, bight C, spring F, and the guide-loops *m* and J.

At some convenient distance between the extremities of bar A, as at *g*, is pivoted a sway bar or lever, B. In a slot or recess at one end of this lever, and somewhere in line between the loops *m* and J, are fixed two small sheaves or pins, *l* and *k*. The lever B and sheaves or pins *l k* constitute a propelling device. Near the end of the other arm of the lever is attached a retractile spring, F, its other point of attachment being at some fixed point on bar A′, as at *i*. The function of this spring is to throw the end of lever B carrying the sheaves or pins *l k* toward bight C, which is a swinging bail or loop having a limited movement and pivoted at *o*. This bight C constitutes a grasping or holding device.

The contour of that portion of bar A against which the loop or bight of the bail C impinges is eccentric to the arc described by the swing of the bight C, so that when bight C is elevated it will strike the edge of this part of bar B just below loop *m*.

To arrange the parts for use the cord E should be passed through loop *m* and through or under bight C, thence under sheave or pin *k*, back up and over sheave or pin *l*, and down through and out of guide-loop J. The apparatus now being strung ready for use, it will be found, by taking one end of the cord in each hand, or by fastening one end of the cord and taking the opposite end in the hand and drawing the cord taut, that the line will take firm hold of and around the pins *l* and *k*, and on further tension being applied to the cord, thus engendering a tendency to straighten out when it winds around pins *l* and *k*, the said pins will be forced around into a position approximately in line with the general direction of the cord. Now, as a resultant from the fact that the cord E, during this operation, does not slip on or around pins *l* and *k*, the other end of lever B is swung up or around in the direction of the arrow, and by means of pivotal attachment *g* the bar A, with its appurtenances, is correspondingly elevated. This upward movement releases bight C from its hold on the cord the moment it commences; but the moment the tension on the cord is sufficiently relaxed the whole figure inclines to slide back on the cord by gravity. The friction generated between the cord and bight C in the inception of this backsliding movement is sufficient to carry bight C up to the point beneath loop *m*, where it will grasp or pinch the cord, and the further slip of the figure on the line is thus arrested. The lower end of the cord may now be set free, and the figure will remain suspended, the gripe of bight C being sustained by the gravity of the rest of the mechanism exerting a downward pull. As the tension on the cord is gradually relaxed, the retractile spring F commences to exert its normal function of throwing the lever B into the position it occupied before the last-above described movement and in so doing carries pins *l* and *k* forward on the slack part of cord E to a point where the same operation may be repeated. Thus it will be seen that every time the free end of cord E is tightened sufficiently to swing lever B around to the limit of its movement it effects an advance of bar A on the cord of one step, equal to the whole forward or advance movement of bar A, less the amount of slip occasioned in bringing bight C into position to grasp the cord, so as to arrest any further backward movement.

The foregoing description is applicable to the figure of the automaton, as shown in Figs. 1 and 2. In the latter case A represents the body of the figure; B, its arms. C, the visor of the cap, answers to the bight C of Fig. 1; D, his cap; E, the cord or line; F, the retractile spring for throwing up the arms or hands; *i*, its lower point of attachment, &c. It will be observed that the spring F is here arranged betweeen the pivotal attachment *g* and the sheaves or pins *k l*.

Fig. 4 shows a duplex application of the invention to a boat or car. In this case the pins or sheaves *l* and *k* are applied to a disk, which has a rotary movement. This is provided so that after the boat has reached the terminus of its passage in one direction, by giving the disk Q about one and a quarter revolution the position of the pins in relation to the cord will be reversed. Two supports for the bights C C are provided, one at each end of the boat, so that when the boat is moving in one direction the bight at the opposite end of the boat is fastened up out of reach of the line. Spring F is also arranged to be reversible—that is to say, its point of attachment *i* may be either on the right or left of the end of lever B. The boat having made a traverse of the cord in one direction, it can be adjusted to return by throwing off or fastening up the bight C last used, giving disk Q the necessary backward turns to reverse the positions of pins *l* and *k* on the line, and there fastening the disk, changing the attachment of spring F to the opposite side of lever B, and releasing the previously-fastened end of the line, and fastening the previously slack end thereof.

In the applications of the principles of my invention just described I have shown the various devices so arranged that the propulsion of the figure or object is secured by the straining of the cord, and the change of position of the levers B or of the arms of the automaton is effected by the retractile spring; but these relative arrangements may be arranged inversely, so that the tightening of the cord shall produce the movement of the arms, and the retraction of the spring shall propel the automaton or other body along the line.

By attaching one end of the cord to an elevated point and manipulating the other end from the ground the automaton may be made to ascend to an indefinite height, to the great amusement of children.

The descent of the figure is secured by gently tightening the cord until the bight C drops down or clear from contact with the cord at its binding-point, when, upon further slackening of the cord, all binding strain or tension of the cord upon the automaton is removed, and the figure gently slides down to the ground.

Any device which will answer the required conditions may be substituted for the bight C, and the retrograde movement of lever B may be effected in a great variety of ways without essentially departing from the principles of my invention; hence I do not restrict myself to the use of the particular devices shown for these purposes respectively.

Having thus described my invention, I claim as new and desire to secure by Letters Patent—

1. In a toy or other body designed to travel along a line or cord, the combination of a grasping or holding device and a propelling device, the grasping or holding device being adapted to maintain the position of the toy or body on the line or cord while the propelling device moves so as to take a new hold on the line or cord, and to release its hold of the line or cord when the propelling device operates to advance or propel the toy or body, substantially as specified.

2. In a toy or other body designed to travel along a line or cord, a grasping or holding device, a propelling device capable of being operated to propel or advance the toy or body by means of a pull or tension on the line or cord, and a spring for operating the propelling device to take a new hold on the line or cord, the grasping or holding device and propelling device being so combined and organized that the grasping or holding device will maintain the position of the toy or body on the line or cord while the propelling device moves so as to take a new hold on the line or cord, and will release its hold of the line or cord when the propelling device operates to advance or propel the toy or body, substantially as specified.

3. In a toy or other body designed to travel along a line or cord, a grasping or holding device and a propelling device, consisting of a lever furnished with sheaves or pins over or around which the line or cord passes, the grasping or holding device and propelling device being so combined that the grasping device will maintain the position of the toy or body on the line or cord while the propelling device moves to take a new hold on the line or cord, and will release its hold of the line or cord when the propelling device operates to advance or propel the toy or body, substantially as specified.

4. As a means for securing propulsion of an automaton or other body along or upon a single cord, a body-piece having at one end a grasping device for intermittently seizing and holding the cord, adapted to be controlled and regulated in its movements by the friction of the cord running through the same, provided at approximate points with guide eyes or loops for governing the direction of the cord, and having pivoted thereto at a suitable distance below the grasping device a lever carrying at its outer or swinging end two pins or sheaves, disposed with reference to each other and to the pivotal attachment of the lever to the body, substantially as shown, and armed with means for returning said lever to position to renew its hold or gripe on the cord, in combination with a cord running through the grasping device, around the pins or sheaves of the said lever, and through the several guide-eyes or loops, as set forth, the whole, when so arranged, being adapted to secure the result aimed at by alternately tightening and slackening the cord, substantially in the manner described and set forth.

WILLIAM C. FARNUM.

Witnesses:
WARREN F. PETERS,
ALBERT J. ATWOOD.